(12) United States Patent
Rutkowski et al.

(10) Patent No.: US 9,080,599 B2
(45) Date of Patent: Jul. 14, 2015

(54) CABLE COUPLING

(71) Applicant: Ridge Tool Company, Elyria, OH (US)

(72) Inventors: Michael J. Rutkowski, Brunswick, OH (US); Jon R. Dunkin, Elyria, OH (US); Hugh Morris, Orange, VA (US)

(73) Assignee: RIDGE TOOL COMPANY, Elyria, OH (US)

( * ) Notice: Subject to any disclaimer, the term of this patent is extended or adjusted under 35 U.S.C. 154(b) by 0 days.

(21) Appl. No.: 14/051,543

(22) Filed: Oct. 11, 2013

(65) Prior Publication Data

US 2015/0105163 A1    Apr. 16, 2015

(51) Int. Cl.
*F16D 1/112* (2006.01)
*F16C 1/08* (2006.01)

(52) U.S. Cl.
CPC ........................................ *F16C 1/08* (2013.01)

(58) Field of Classification Search
USPC .............. 464/110, 182, 901; 403/109.3, 364, 403/376; 15/104.33
See application file for complete search history.

(56) References Cited

U.S. PATENT DOCUMENTS

| | | | |
|---|---|---|---|
| 881,075 A | 3/1908 | Hosking | |
| 2,169,543 A | 8/1939 | Sullivan | |
| 2,557,119 A | 6/1951 | Kjerulff | |
| 2,769,191 A | 11/1956 | Hunt et al. | |
| 3,397,420 A * | 8/1968 | Schneider | .................. 15/104.33 |
| 4,403,885 A * | 9/1983 | Babb | |
| 4,802,783 A | 2/1989 | Erikson | |
| 5,618,123 A | 4/1997 | Pulse | |
| 6,760,948 B2 | 7/2004 | Schmitt | |
| 2011/0182656 A1 | 7/2011 | Babb | |

* cited by examiner

*Primary Examiner* — Gregory Binda
(74) *Attorney, Agent, or Firm* — Mark E. Bandy; Rankin, Hill & Clark LLP

(57) ABSTRACT

Cable coupling assemblies are described which can be readily engaged and separated from one another. The couplings are particularly useful for use in torque transmitting cables such as those used in drain cleaning applications.

13 Claims, 11 Drawing Sheets

CABLE COUPLING

FIELD

The present subject matter relates to releasable couplings for rotating cable assemblies such as used in drain cleaning tools.

BACKGROUND

A variety of couplings and coupling assemblies are known in the art for engaging a torque transmitting cable such as a drain cleaning cable to another cable or component. Many of these couplings utilize male and female components attached at corresponding cable ends. The male and female components typically include interlocking shapes or configurations that once engaged, provide axial engagement of a cable section or component to another.

In order to additionally secure such interlocking male and female components to one another and prevent unintended disengagement, an array of assemblies and fasteners have been used to further secure the components to one another. An example of a coupling assembly with such engagement provisions is described in US 2011/0182656. The '656 publication describes a key 45 that is either depressed or rotated which thereby allows a male component 20 to be fully received and engaged in a corresponding female component 40.

Although satisfactory in many respects, a need remains for a cable coupling assembly that can be used in a wide range of applications, is relatively low cost, will provide long durability and service, and can be quickly and easily engaged or disengaged as desired.

SUMMARY

The difficulties and drawbacks associated with previously known couplings and assemblies are addressed in the present coupling assemblies.

In one aspect, the present subject matter provides a drain cleaning cable coupling assembly comprising a male coupling including a pair of engagement prongs. The engagement prongs are spaced apart from one another and define a docking region therebetween. The cable coupling assembly also comprises a female coupling having a circumferential wall defining a pair of receiving regions sized and shaped to fittingly engage the pair of engagement prongs of the male coupling. The female coupling also defines an outer end face. The circumferential wall of the female coupling defines a generally hollow interior chamber accessible via the end face and the pair of receiving regions. The cable coupling assembly also comprises a plunger movably disposed within the interior chamber of the female coupling. The plunger is linearly displaceable between a retracted position and an extended position.

In another aspect, the present subject matter provides a torque transmitting cable coupling assembly comprising a male coupling including (i) a disc shaped head defining an outer face and an oppositely directed inner face, (ii) a centrally disposed and axially extending cable receiving section extending from the inner face of the head, and (iii) a pair of axially extending engagement prongs extending from the outer face of the head. The pair of engagement prongs are spaced apart from each other to thereby define a docking region. The cable coupling assembly also comprises a female coupling including (i) a cylindrical body having an outer circumferential surface and defining an outer face and an oppositely directed inner face, the body further defining an interior chamber accessible from the outer face of the body, and (ii) a centrally disposed and axially extending cable receiving section extending from the inner face of the body, the body further defining a pair of receiving regions in the body. Each receiving region extends between the outer circumferential surface and the interior chamber and each receiving region is sized and shaped to fittingly engage a corresponding engagement prong of the male coupling. The cable coupling assembly also comprises a plunger movably disposed in the interior chamber defined in the body of the female coupling. The plunger is axially positionable within the interior chamber between (i) a retracted position in which the pair of receiving regions defined in the body of the female coupling are unobstructed and (ii) an extended position in which at least a portion of the plunger obstructs the pair of receiving regions defined in the body of the female coupling assembly.

As will be realized, the subject matter described herein is capable of other and different embodiments and its several details are capable of modifications in various respects, all without departing from the claimed subject matter. Accordingly, the drawings and description are to be regarded as illustrative and not restrictive.

DETAILED DESCRIPTION OF THE EMBODIMENTS

Figure 1:
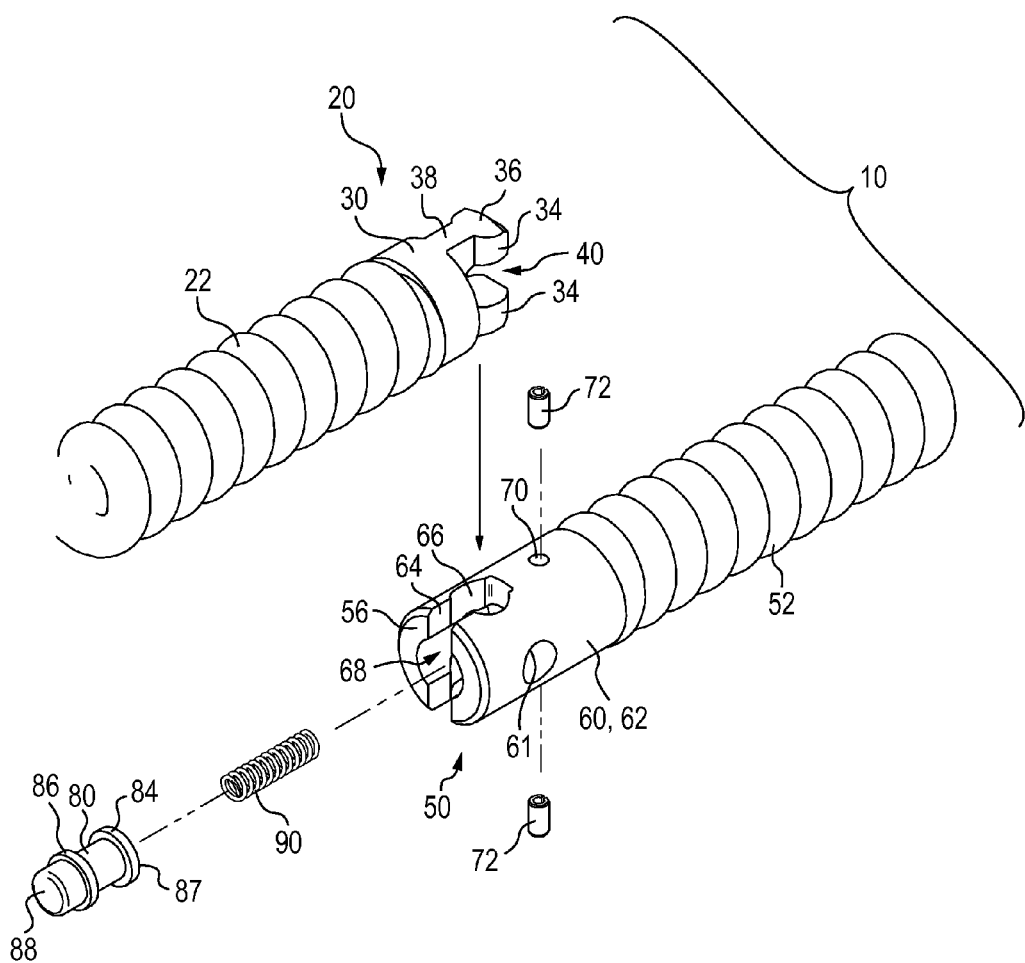
FIG. 1 is a schematic exploded and perspective view of an embodiment of a cable coupling in accordance with the present subject matter.

The coupling assemblies of the present subject matter generally comprise a male coupling and a female coupling that can be securely connected by engaging the two components with or without a tool. In certain embodiments, a biased plunger retained in the female coupling is urged or linearly displaced out of coupling overlap, i.e., retracted, so the couplings may be engaged together perpendicular to a cable axis. Once connected, the biased plunger is displaced toward the male coupling to prevent perpendicular movement between the couplings. The connected couplings provide a secure joint able to withstand the forces generated by the rotating cable. To disconnect the couplings from one another, the plunger is retracted from the coupling overlap. A tool may be inserted into an aperture in the female coupling to assist in retracting the plunger from the coupling overlap so the couplings can be at least partially separated. The tool is then removed and the couplings can be detached from each other by displacing or moving them perpendicular to the cable axis.

Specifically, the present subject matter provides several embodiments of the coupling assembly. In one version, at least one projection and more particularly two radially oriented and diametrically disposed pins are used in the female coupling. The pins project into an interior chamber in the female coupling which houses a spring-biased axially positionable plunger. The two pins retain the plunger within the female coupling. Depending upon the axial position of the plunger in the female coupling, the male coupling is either engaged or releasable therefrom.

In another version, the assembly uses an expanded collar positioned within the interior chamber of the female coupling. The collar is sized to slidably receive the plunger. The collar is used instead of the two pins, and serves to retain the plunger within the female coupling.

In yet another version, the assembly utilizes a plunger having a tool-receiving passage extending across a thickness or diameter of the plunger. The female coupling includes a slotted or enlarged aperture through which the passage in the plunger can be accessed. The plunger can be readily retracted within the female coupling by inserting a tool in the slotted aperture and at least partially within the plunger passage and then moving the tool and plunger away from the male coupling. These and other aspects are described in greater detail herein.

FIGS. 1-5 depict a cable coupling 10 in accordance with the present subject matter. The cable coupling 10 comprises a male coupling 20, a female coupling 50, and a linearly positionable plunger 80 disposed within the female coupling.

The male coupling 20 includes a head 30 defining an inner face 28 and an oppositely directed outer face 26. The male coupling 20 also includes a cable receiving section 24 generally extending from the inner face 28 of the head 30. The cable receiving section 24 typically includes provisions to support and securely retain an end of an adjoining cable 22. An example of such provisions include a radially projecting and helically extending ridge in the section 24 corresponding to the size and configuration of the cable 22. The male coupling 20 also comprises one or more, and typically a pair, of engagement prongs 34 extending from the outer face 26 of the head 30. Each engagement prong includes an expanded or bulbous end region 36 and a projection member 38 extending between the expanded end region 36 and the outer face 26. The engagement prongs 34 are spaced apart from one another to thereby define a docking region 40 between the engagement prongs 34 for a plunger, as described in greater detail herein.

The female coupling 50 includes a body 60 defining an inner face 58 and an oppositely directed outer face 56. The coupling 50 also includes a cable receiving section 54 extending from the inner face 58 of the body 60 for engagement with an end of an adjoining cable 52. The section 54 can include provisions to promote engagement and contact with cable 52 such as previously described with regard to the cable receiving section 24 of the male coupling 20. The female coupling 50 and particularly the body 60 defines an outer circumferential surface 62 and an interior chamber 68 which in certain embodiments is cylindrical or at least partially cylindrical in shape. However, the present subject matter includes other shapes and configurations for the interior chamber. A circumferential wall 64 of the body 60 may provide the outer circumferential surface 62 and define the interior chamber 68. The female coupling 50 also defines at least one, and typically a pair, of receiving regions 66. The interior chamber 68 is generally accessible via the receiving regions 66 and the outer end face 56. The receiving regions 66 are generally sized and shaped to fittingly engage the engagement prongs 34 of the male coupling 20. The female coupling 50 also defines an interior end wall 76 which also constitutes or partially constitutes an end wall of the interior chamber 68.

The cable coupling 10 also comprises a plunger 80. The plunger 80 is sized and shaped to movably reside within the interior chamber 68 defined in the female coupling 50. In many embodiments, the plunger 80 is cylindrical in shape. Regardless, the plunger defines an inner end 87 that faces the interior wall 76 within the female coupling, and an oppositely directed outer end 88. The plunger 80 also includes at least one member extending laterally outward from an outer surface of the plunger. In certain embodiments, such member is in the form of a radially extending ridge that extends around or partially around the circumference of the plunger. Particularly, in such embodiments, the plunger 80 includes an inner ridge 84 proximate the inner end 87, and an outer ridge 86 proximate the outer end 88. One or more biasing members such as a coil spring 90 for example can be used to bias the plunger to an extended position as described in greater detail herein. In certain embodiments, the plunger 80 can be configured to interface and/or receive the spring 90. For example, as depicted in FIGS. 2-5, the plunger 80 can include a recessed region 81 accessible along the inner end 87 of the plunger that receives the spring 90.

Figure 2:
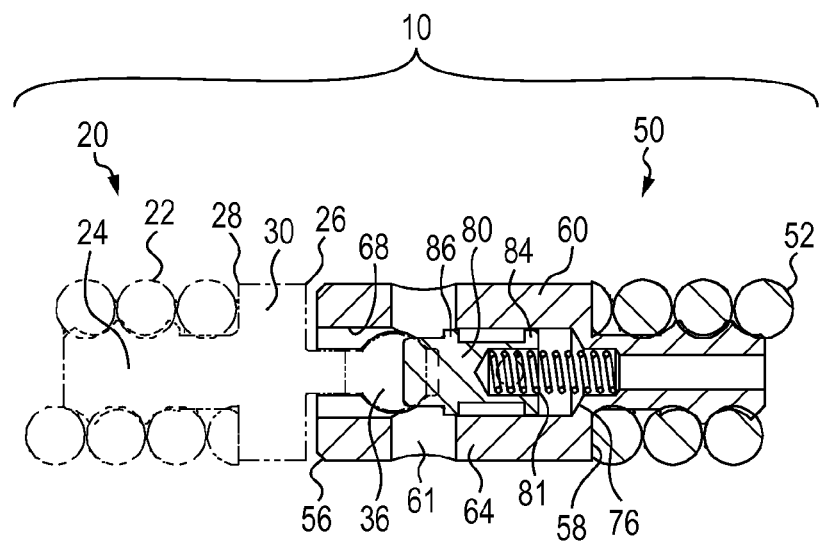
FIG. 2 is a schematic cross sectional side view of the cable coupling of FIG. 1 illustrating a plunger of the cable coupling in an extended position.
Figure 3:
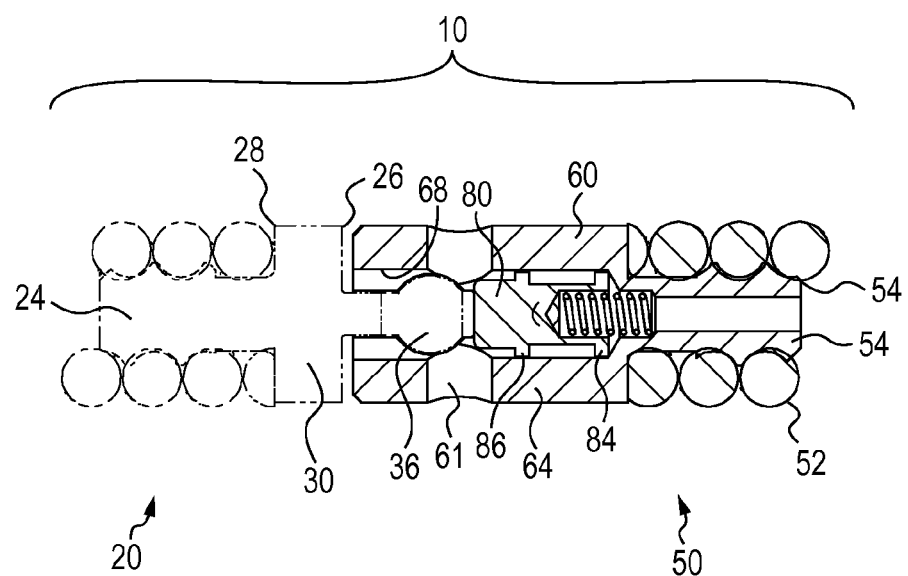
FIG. 3 is a schematic cross sectional side view of the cable coupling of FIG. 1 illustrating the plunger in a retracted position.
Figure 4:
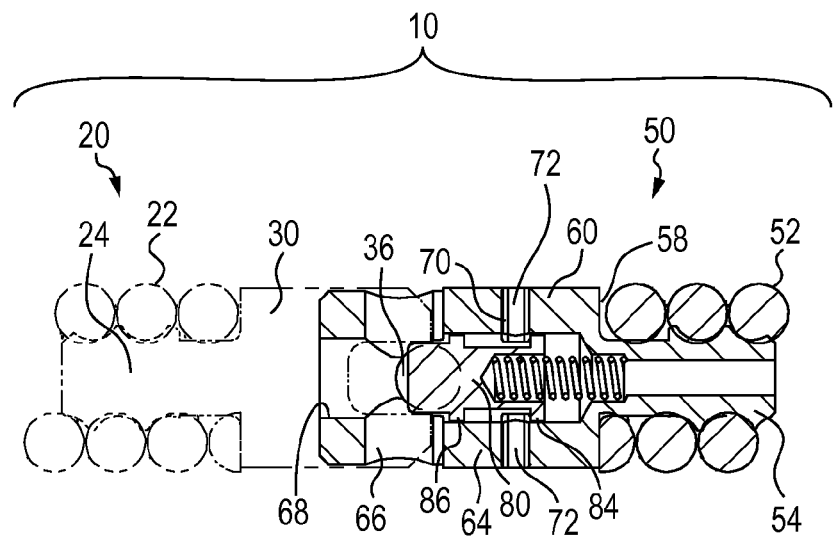
FIG. 4 is a schematic cross sectional top view of the cable coupling of FIG. 1 illustrating the plunger in an extended position.
Figure 5:
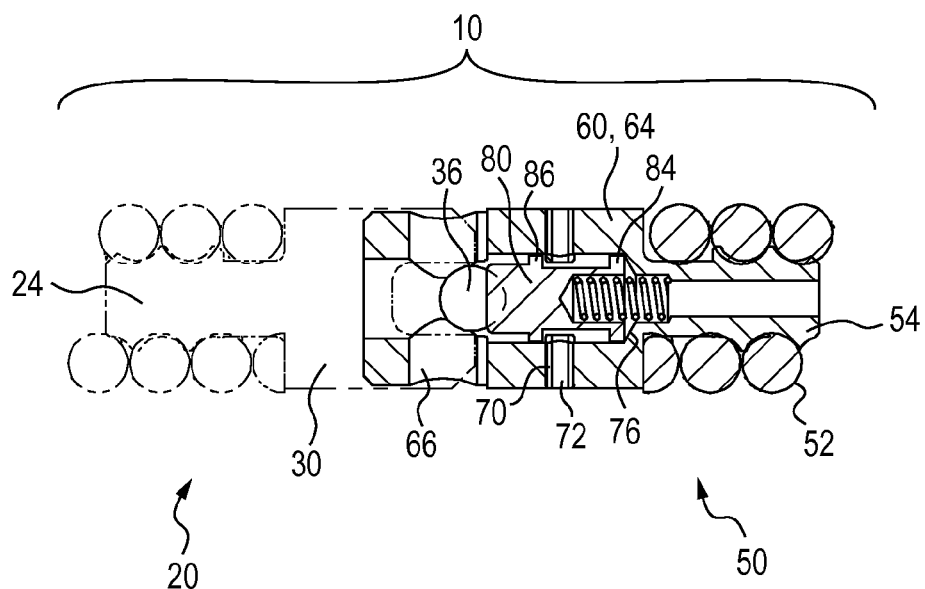
FIG. 5 is a schematic cross sectional top view of the cable coupling of FIG. 1 illustrating the plunger in a retracted position.

The plunger 80 and biasing member(s) 90 are disposed within the interior chamber 68 defined in the female coupling 50. Typically, the female coupling 50 also includes one or more projections that extend into the interior chamber 68 of the body 60. The projection(s) is located in the interior chamber 68 relative to the plunger 80 also disposed therein, such that the projection contacts at least one of the previously noted inner ridge 84 or outer ridge 86 of the plunger, depending upon the positional state of the plunger, i.e., extended or retracted. In certain embodiments, upon positioning the plunger 80 to an extended position such as shown in FIGS. 2 and 4, the projection contacts the inner ridge 84 and thus serves to preclude further axial displacement of the plunger 80 relative to the female coupling 50 and thus retains the plunger 80 within the interior chamber 68. Upon positioning the plunger 80 to a retracted position such as shown in FIGS. 3 and 5, the inner ridge 84 may contact the interior end wall 76 and/or the projection may contact the outer ridge 86. In certain embodiments, the projection can be in the form of a pin 72, or a pair of such pins, that is received in a radial aperture 70 defined in the body 60 of the female coupling 50.

In the coupling assembly 10 depicted in FIGS. 1-5, the male coupling 20 is engaged with the female coupling 50 as follows. One engagement prong 34 is aligned with and then inserted into one of the receiving regions 66 of the female coupling 50. The plunger 80 is retracted and typically against a biasing force provided by the spring 90 into a retracted position as shown in FIGS. 3 and 5 so that the pair of receiving regions 66 are unobstructed by the plunger. As described in greater detail herein, a key or tool may be used to assist in plunger retraction. The male coupling 20 is moved into further engagement with the female coupling 50 so that the engagement prong 34 previously disposed in one of the receiving regions 66 is positioned into the other previously unoccupied receiving region 66. Thus, the other engagement prong 34 is also positioned into the other previously occupied receiving region 66. The plunger 80 is then moved to its extended position such as shown in FIGS. 2 and 4. In its extended position, the plunger and particularly its outer end 88, is disposed within the docking region 40 defined between the engagement prongs 34 thereby preventing unintended disengagement between the male and female couplings.

As noted, a tool (not shown) can optionally be used during engagement and/or disengagement of the male and female couplings 20, 50. If a tool is used, a sufficiently sized and shaped tool is inserted into an aperture such as aperture 61 defined in the body 60 of the female coupling 50. The tool contacts the plunger 80 and is used to move the plunger to a retracted position. If a tool is not used, one of the engagement prongs 34 can be used to contact the plunger 80 and move the plunger to a retracted position. It is also contemplated that a portion or region of the engagement prong 34 can be angled, chamfered, or inclined to promote retraction of the plunger during displacement of a prong 34 in a direction that is perpendicular to a cable axis.

Figure 6:
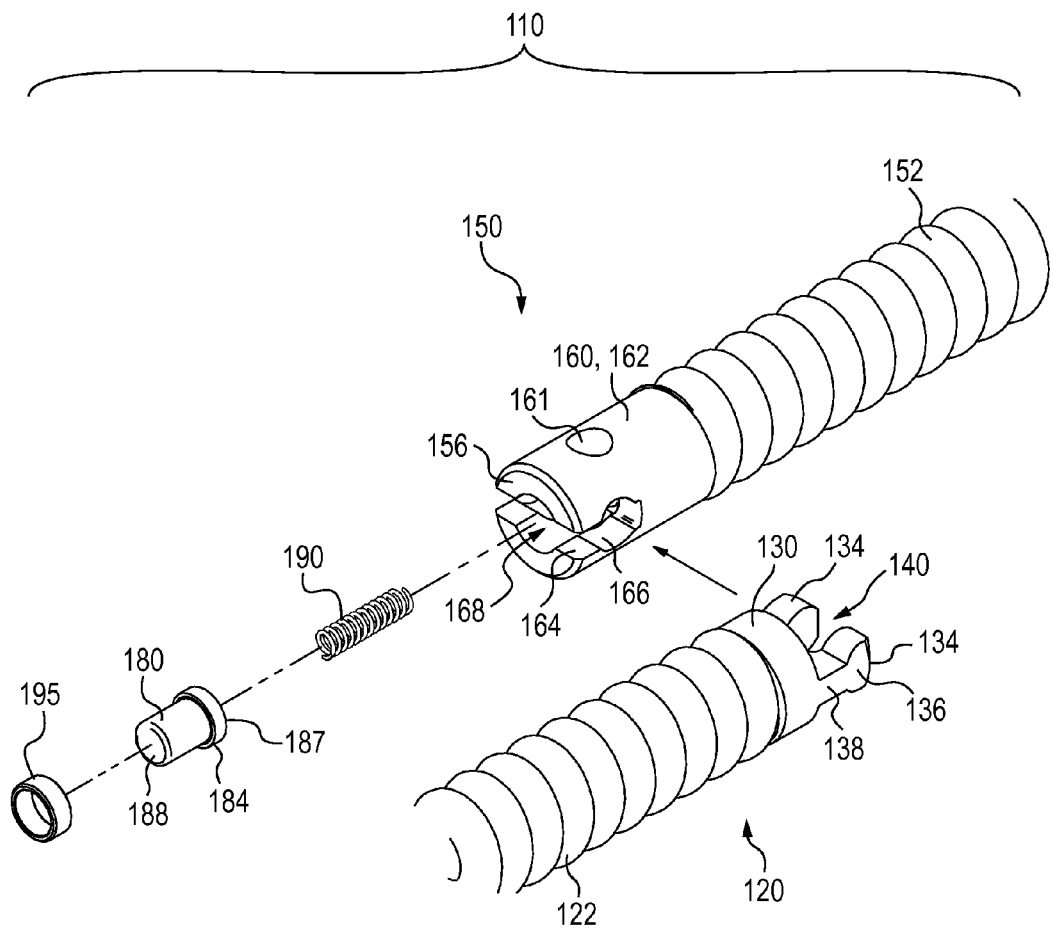
FIG. 6 is a schematic exploded and perspective view of another embodiment of a cable coupling in accordance with the present subject matter.
Figure 7:
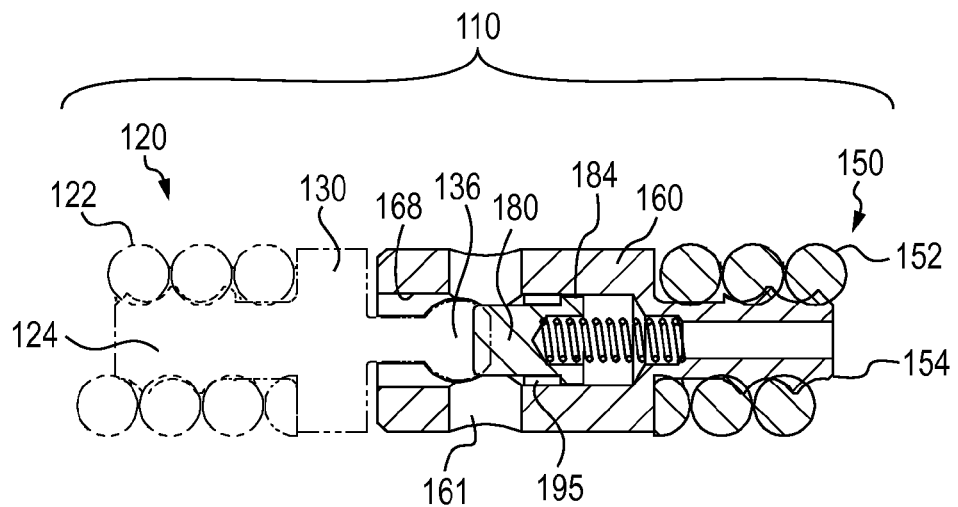
FIG. 7 is a schematic cross sectional side view of the cable coupling of FIG. 6 illustrating a plunger of the cable coupling in an extended position.
Figure 8:
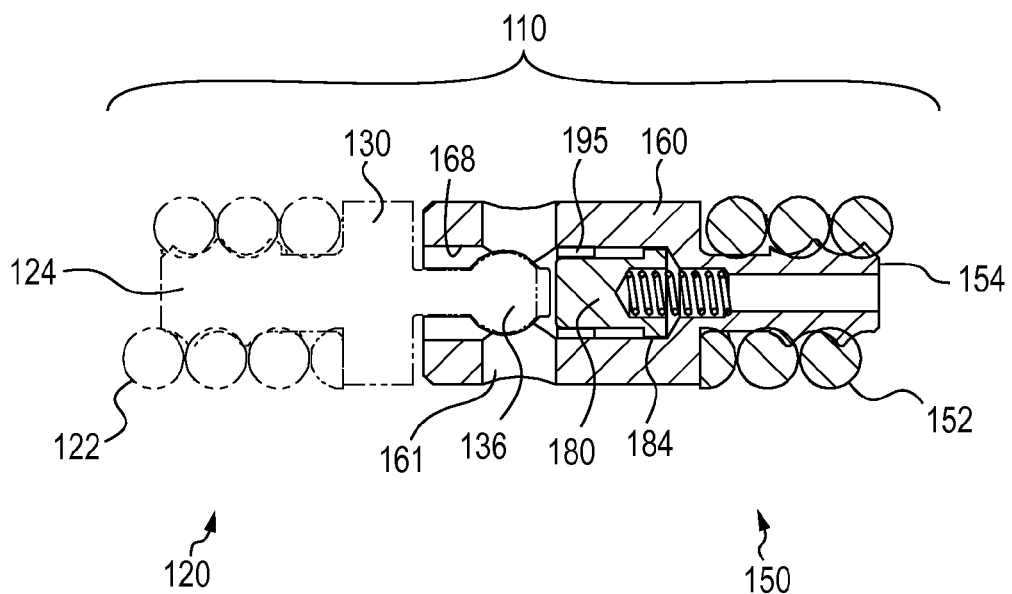
FIG. 8 is a schematic cross sectional side view of the cable coupling of FIG. 6 illustrating the plunger in a retracted position.
Figure 9:
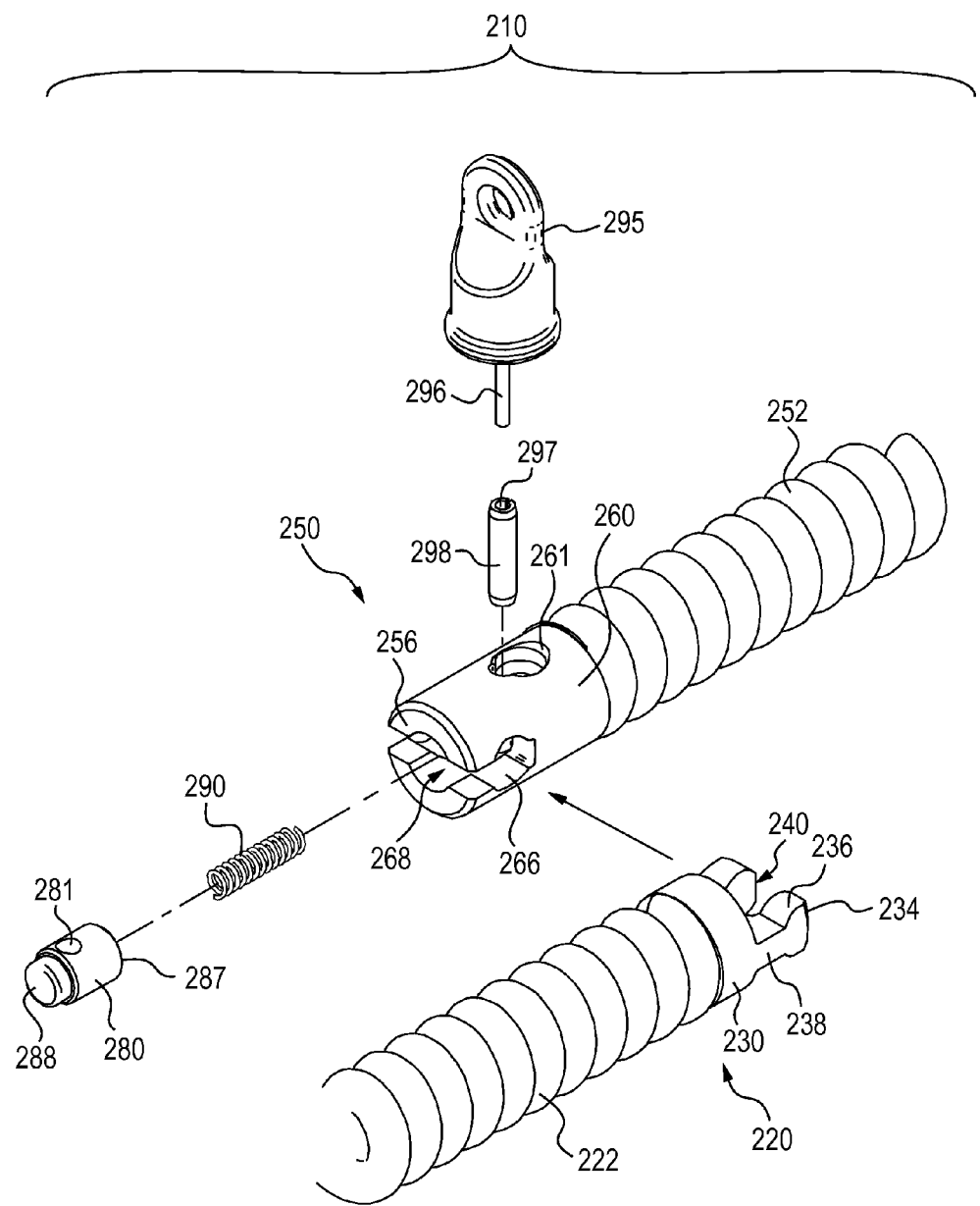
FIG. 9 is a schematic exploded and perspective view of another embodiment of a cable coupling and a tool in accordance with the present subject matter.

FIGS. 6-8 illustrate another cable coupling 110 in accordance with the present subject matter. The cable coupling 110 comprises a male coupling 120 and a female coupling 150, and a linearly positionable plunger 180 disposed in the female coupling 150.

The male coupling 120 generally corresponds to the previously described male coupling 20 and includes a head 130 and a cable receiving section 124 for engaging an end of a cable 122, and one or more and particularly a pair of engagement prongs 134. Each engagement prong 134 includes an expanded end region 136 and a projection 138 as shown and as previously described. A docking region 140 is defined between the spaced apart prongs 134 also as previously described.

The female coupling 150 includes a body 160 which is generally as the previously described body 60. The body 160 defines an outer circumferential surface 162. The female coupling 150 defines an interior chamber 168 and corresponding receiving regions 166 for the engagement prongs 134. The interior chamber 168 is accessible via the receiving regions 166 and an outer end face 156 of the female coupling 150. The female coupling 150 also includes a cable receiving section 154 for engaging an end of a cable 152. These features are as those associated with the previously described female coupling 50.

The cable coupling 110 also comprises a plunger 180 which is typically cylindrical in shape. The plunger 180 includes a projection which in certain embodiments is in the form of an inner ridge 184 extending around the circumference of the plunger 180 and located proximate an inner end 187 of the plunger. The plunger 180 also defines an oppositely directed outer end 188. One or more biasing members or springs 190 can be used to bias or urge the plunger 180 to an extended position as described in greater detail herein.

The cable coupling 110 also comprises a collar 195 that is sized and shaped and incorporated within the interior chamber 168 of the female coupling 150 so as to retain the plunger 180 within that chamber 168. As shown in FIG. 7, the collar 195 is positioned within the interior chamber 168 such that upon extension of the plunger 180 such as due to the spring 190, the collar 195 contacts the inner ridge 184 of the plunger and thereby retains the plunger 180 within the chamber 168 of the female coupling 150. In certain embodiments, the plunger 180 is disposed within the collar 195 and contacts the collar 195 at both the retracted position as shown in FIG. 8 and the extended position as shown in FIG. 7.

Engagement between the male coupling 120 and the female coupling 150 in the coupling assembly 110 occurs in the same manner as described in association with the coupling assembly 10. A tool (not shown) may optionally be used to assist in engaging and/or disengaging the couplings 120, 150 from one another by insertion into an aperture 161 of the female coupling 150.

FIGS. 9-13 illustrate another cable coupling 210 in accordance with the present subject matter. The cable coupling 210 comprises a male coupling 220, a female coupling 250, and a linearly positionable plunger 280 disposed in the female coupling 250.

The male coupling 220 generally corresponds to the previously described male coupling 20 and includes a head 230 and a cable receiving section 224 for engaging an end of a cable 222, and one or more and particularly a pair of engagement prongs 234. Each engagement prong 234 includes an expanded end region 236 and a projection 238 as shown and as previously described. A docking region 240 is defined between the spaced apart prongs 238 also as previously described.

The female coupling 250 includes a body 260 which is generally as the previously described body 60 of the female coupling 50. The female coupling 250 defines an interior chamber 268 and corresponding receiving regions 266 for the engagement prongs 234 of the male coupling 220. The interior chamber 268 is accessible via the receiving regions 266 and an outer end face 256 of the female coupling. The female coupling 250 also includes a cable receiving section 254 for engaging an end of a cable 252. These features are as those associated with the previously described female coupling 50.

The cable coupling 210 also comprises a plunger 280 which is typically cylindrical in shape. The plunger 280 defines an inner end 287. The plunger 280 also defines an oppositely directed outer end 288. One or more biasing members or springs 290 can also be used to bias or urge the plunger 280 to an extended position as described in greater detail herein. The plunger 280 defines a passage 281 that extends across at least a portion of a thickness of the plunger or if the plunger is cylindrical, the passage 281 extends diametrically across the plunger. The female coupling 250 defines a slotted or enlarged aperture 261 through which the plunger passage 281 can be accessed, particularly as follows. Generally, the plunger passage can be accessed via the aperture 261 when the plunger is positioned to one or both of the retracted and extended positions. In certain embodiments, the aperture allows accessing the plunger passage at both retracted and extended positions of the plunger.

The cable coupling 210 may optionally also include a tool 295 that comprises a longitudinal member 296 for insertion into the aperture 261 of the female coupling 250 and further into the plunger passage 281. A sleeve 298 can also be provided that is disposed in or otherwise engaged with the plunger 280 and which is accessed through the aperture 261 such as by use of the tool 295. In a particular embodiment, the sleeve 298 extends through the plunger passage 281. The sleeve 298 defines an interior bore 297 which accommodates the longitudinal member 296 of the tool 295. The tool 295 can also be used without the sleeve 298. The tool is sized such that the longitudinal member 296 can be at least partially inserted into the plunger passage. If a sleeve is used, the sleeve is at least partially disposed in the plunger passage and can be accessed via the aperture 261.

Figure 10:
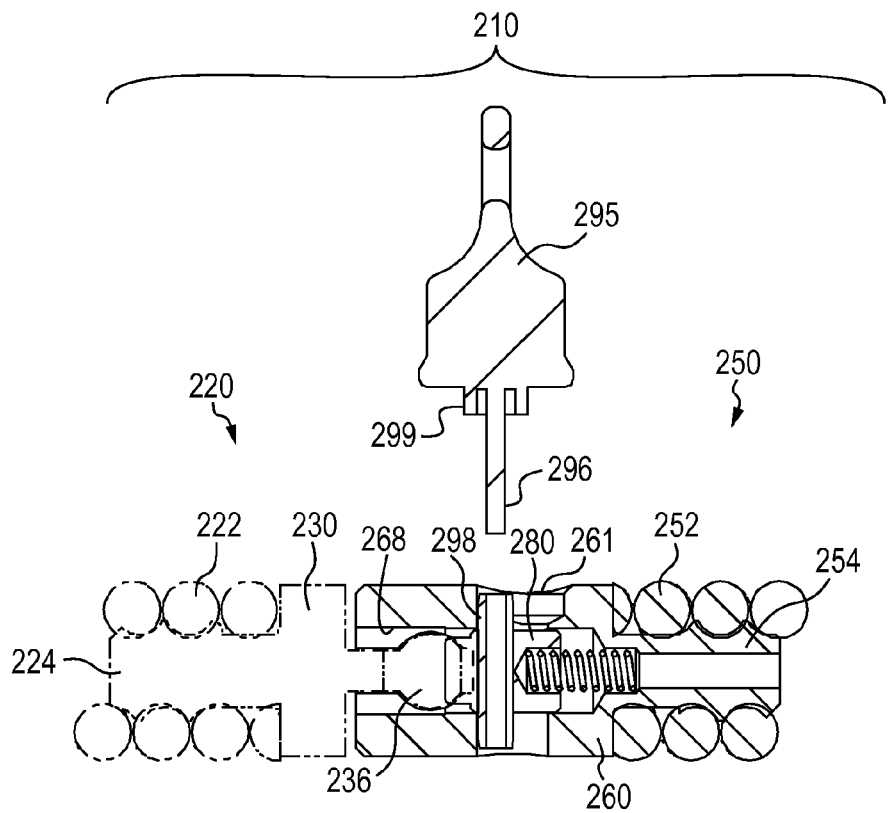
FIG. 10 is a schematic cross sectional side view of the cable coupling of FIG. 9 illustrating a plunger of the cable coupling in an extended position.
Figure 11:
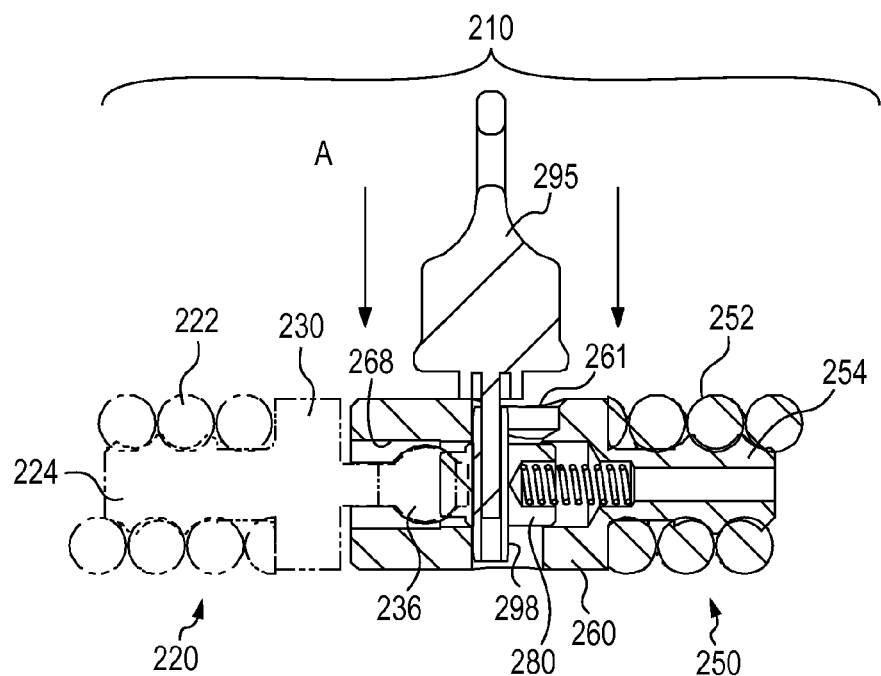
FIG. 11 is a schematic cross sectional side view of the cable coupling of FIG. 9 illustrating insertion of the tool into a female coupling.
Figure 12:
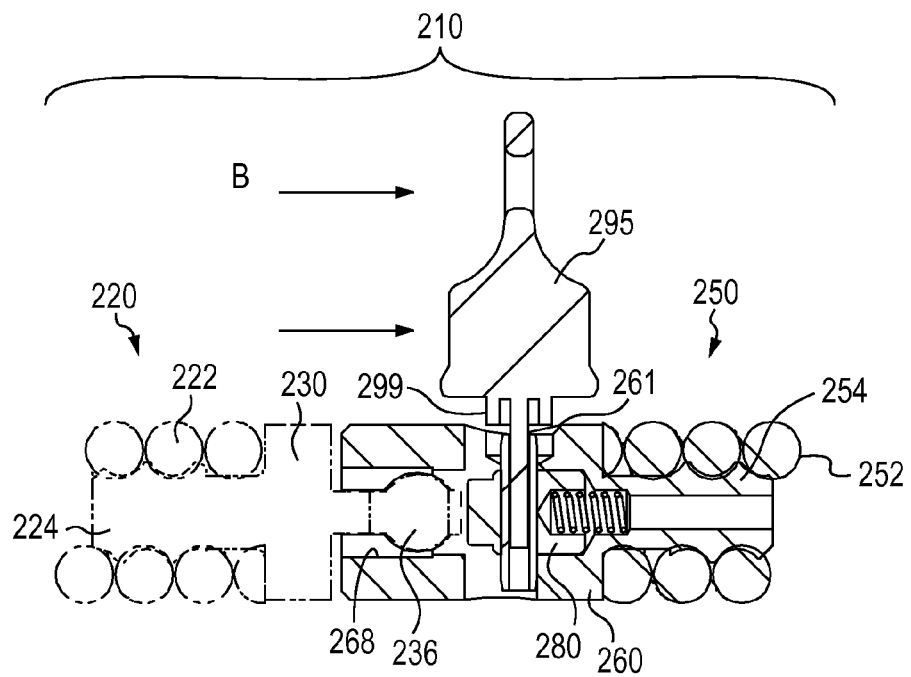
FIG. 12 is a schematic cross sectional side view of the cable coupling of FIG. 9 illustrating the plunger in a retracted position.

Referring further to FIGS. 9-13, engaged male and female couplings 220 and 250 respectively, can be disengaged from one another by inserting the longitudinal member 296 of the tool 295 into the bore 297 of the sleeve 298. This operation is depicted in FIG. 11 in which the tool 295 is moved in the direction of arrow A. Once the tool 295 is appropriately inserted, the tool 295 is linearly displaced away from the male coupling 220 in the direction of arrow B in FIG. 12. Such movement results in retraction of the plunger 280 and specifically, withdrawal of the plunger 280 from the docking region 240 defined between the pair of engagement prongs 234 of the male coupling 220. Once the plunger 280 is linearly displaced to its retracted position as shown in FIG. 12, the male and female couplings can be separated or otherwise disengaged from one another.

Figure 13:
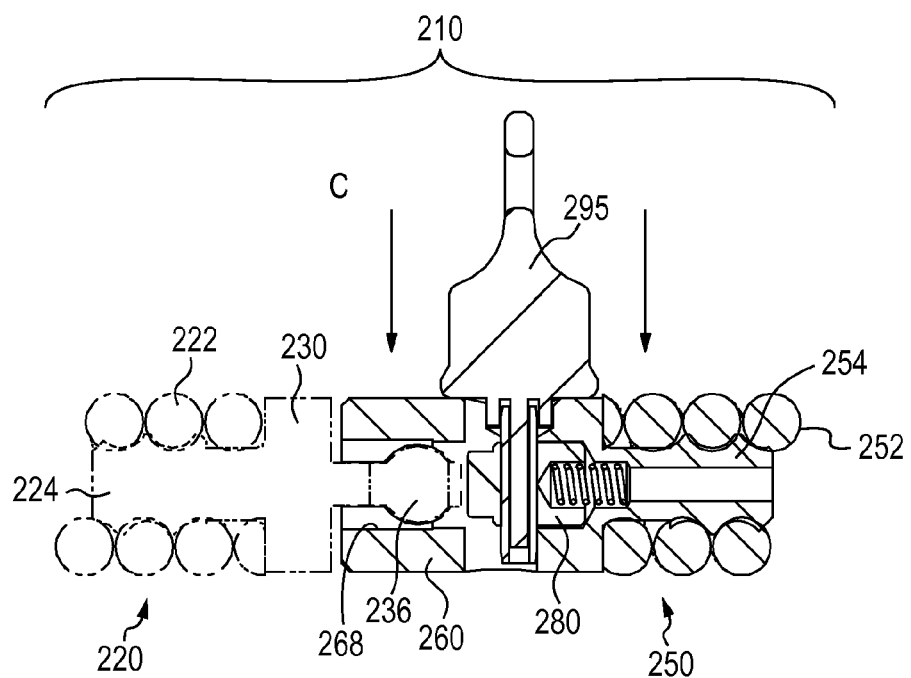
FIG. 13 is a schematic cross sectional side view of the cable coupling of FIG. 9 illustrating retaining the plunger in a retracted position.
Figure 14:
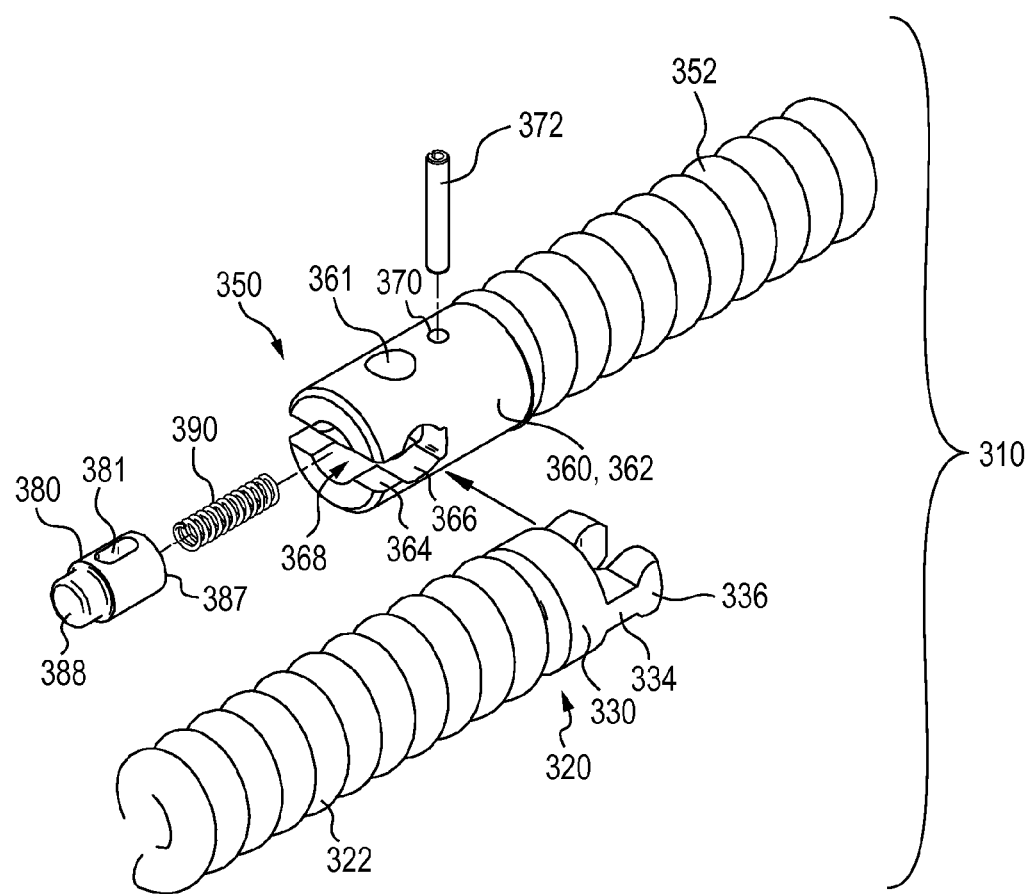
FIG. 14 is a schematic exploded and perspective view of another embodiment of a cable coupling in accordance with the present subject matter.
Figure 15:
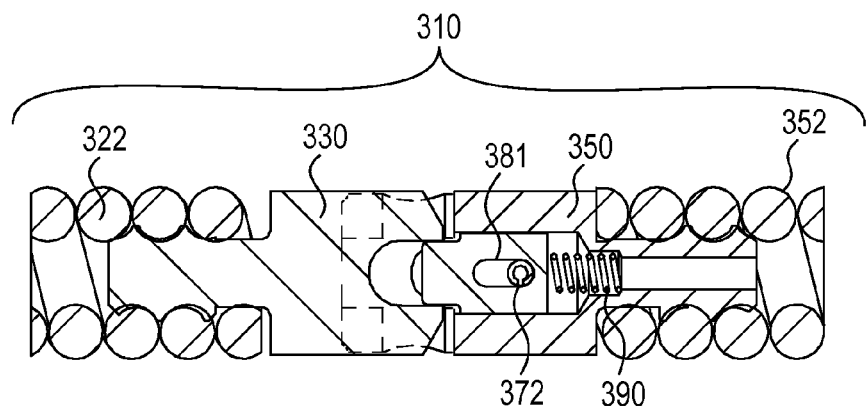
FIG. 15 is a schematic cross sectional top view of the cable coupling of FIG. 14 illustrating a plunger of the cable coupling in an extended position.
Figure 16:
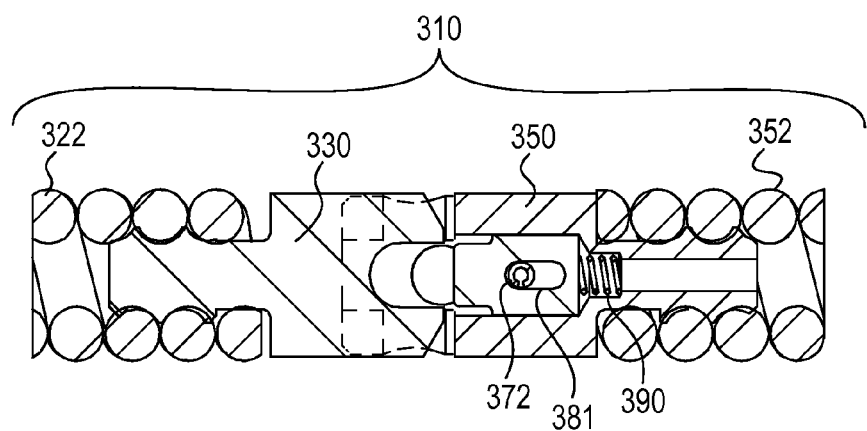
FIG. 16 is a schematic cross sectional top view of the cable coupling of FIG. 14 illustrating the plunger in a retracted position.
Figure 17:
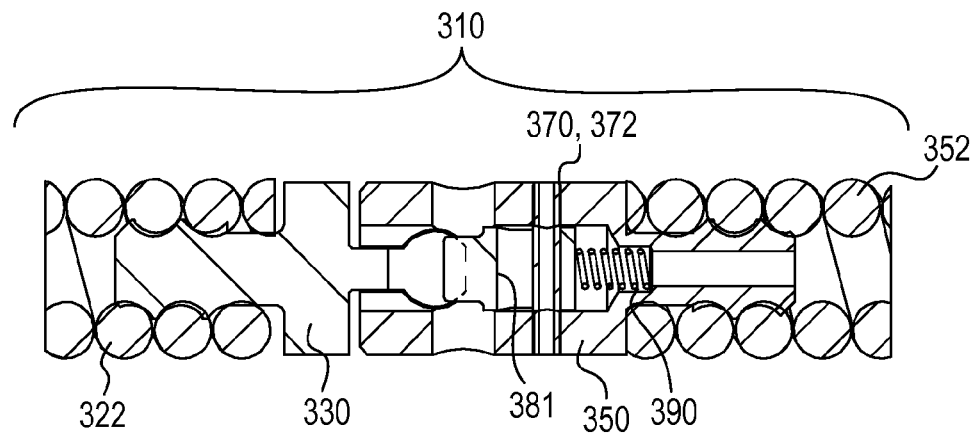
FIG. 17 is a schematic cross sectional side view of the cable coupling of FIG. 14 illustrating a plunger of the cable coupling in an extended position.
Figure 18:
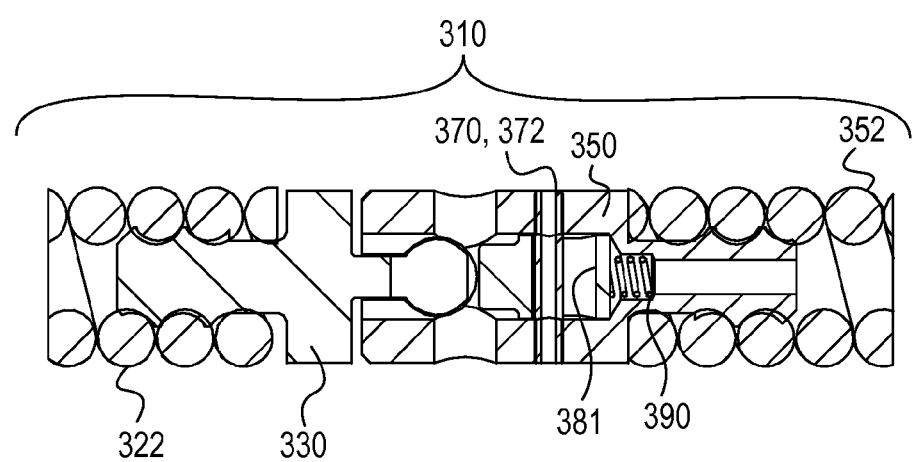
FIG. 18 is a schematic cross sectional side view of the cable coupling of FIG. 14 illustrating the plunger in a retracted position.

In certain embodiments, the tool 295 and the female coupling 260 are provided with provisions to retain the plunger 280 in a desired position such as in a retracted position. Such provisions are useful when one or more biasing members are used such as springs 290 that bias or urge the plunger 280 to an extended position such as shown in FIGS. 10-11. The provisions to retain the plunger 280 in a retracted position can include a projecting face or ledge 299 defined along a face of the tool 295 from which the longitudinal member 296 extends. The projecting face 299 is sized and shaped to be received in an outer region of the enlarged aperture 261 of the female coupling 250. Thus, after linear displacement of the plunger 280 by moving the tool 295 in the direction of arrow B as shown in FIG. 12, the tool 295 is further inserted into the female coupling 250 as shown in FIG. 13. Specifically, as shown in FIG. 13, the tool 295 is moved in the direction of arrow C to insert or seat the projecting face 299 into the enlarged aperture 261 of the female coupling 260. Upon such insertion and seating of the tool 295 into the aperture 261 of the female coupling 250, the plunger 280 is retained in its retracted position.

FIGS. 14-18 illustrate another cable coupling 310 in accordance with the present subject matter. The cable coupling 310 comprises a male coupling 320 and a female coupling 350, and a linearly positionable plunger 380 disposed in the female coupling 350.

The male coupling 320 generally corresponds to the previously described male coupling 20 and includes a head 330 and a cable receiving section for engaging an end of a cable 322, and one or more and particularly a pair of engagement prongs 334. Each engagement prong 334 includes an expanded end region 336 and a projection as shown and as previously described. A docking region is defined between the spaced apart prongs 334 also as previously described.

The female coupling 350 includes a body 360 which is generally as the previously described body 60. The body 360 defines an outer circumferential surface 362. The female coupling 350 defines an interior chamber 368 and corresponding receiving regions 366 for the engagement prongs 334. The interior chamber 368 is accessible via the receiving regions 366 and an outer end face of the female coupling 350. The female coupling 350 also includes a cable receiving section for engaging an end of a cable 352. These features are as those associated with the previously described female coupling 50.

The cable coupling 310 also comprises a plunger 380 which is typically cylindrical in shape. The plunger 380 defines an inner end 387. The plunger 380 also defines an oppositely directed outer end 388. One or more biasing members or springs 390 can be used to bias or urge the plunger 380 to an extended position as described in greater detail herein.

The plunger 380 also defines a slotted or elongated passage or aperture 381 which is sized and shaped to slidably receive a pin 372. As depicted in the referenced figures, the pin 372 extends through apertures 370 defined in the female coupling 350 and also at least partially extends through the plunger 380 via the slotted aperture 381. The configuration of the pin 372, female coupling 350, and plunger 380 of FIGS. 14-18 is similar to that of the sleeve 298, female coupling 250, and plunger 280 of FIGS. 9-13. However, in the assembly 210 shown in FIGS. 9-13, upon linear displacement of the plunger 280 within the female coupling 250, the sleeve 298 is also linearly displaced. Such linear displacement is accommodated by the slotted or elongated aperture 261 defined in the female coupling 250. In contrast, in the assembly 310 shown in FIGS. 14-18, upon linear displacement of the plunger 380 within the female coupling 350, the pin 372 remains stationary with respect to the female coupling 350. Although the pin 372 extends through the plunger 380, linear displacement of the plunger 380 is accommodated by the slotted aperture 381 defined in the plunger 380.

Engagement between the male coupling 320 and the female coupling 350 in the coupling assembly 310 occurs in the same manner as described in association with the coupling assembly 10. A tool (not shown) may optionally be used to assist in engaging and/or disengaging the couplings 320, 350 from one another by insertion into an aperture 361 of the female coupling 350.

The present subject matter includes various combinations of components and features of one embodiment with other components and features of other embodiments. Moreover, the present subject matter also includes various methods of use of the coupling assemblies and methods of securely engaging a cable or cable component with another cable or cable component.

Many other benefits will no doubt become apparent from future application and development of this technology.

All patents, published applications, and articles noted herein are hereby incorporated by reference in their entirety.

As described hereinabove, the present subject matter solves many problems associated with previous strategies, systems and/or devices. However, it will be appreciated that various changes in the details, materials and arrangements of components, which have been herein described and illustrated in order to explain the nature of the present subject matter, may be made by those skilled in the art without departing from the principle and scope of the claimed subject matter, as expressed in the appended claims.

What is claimed is:

1. A drain cleaning cable coupling assembly comprising:
a male coupling including a pair of engagement prongs, the engagement prongs spaced apart from one another and defining a docking region therebetween;
a female coupling having a circumferential wall defining a pair of receiving regions sized and shaped to fittingly engage the pair of engagement prongs of the male coupling, the female coupling also defining an outer end face, the circumferential wall defining a generally hollow interior chamber accessible via the end face and the pair of receiving regions;
a plunger movably disposed within the interior chamber of the female coupling, the plunger linearly displaceable between a retracted position and an extended position, the plunger including at least one radially extending ridge that extends around the circumference of the plunger.

2. The coupling assembly of claim 1 wherein upon engagement between the male coupling and the female coupling, the pair of engagement prongs of the male coupling are disposed in the pair of receiving regions of the female coupling.

3. The coupling assembly of claim 2 wherein upon engagement of the male coupling and the female coupling, the plunger can be displaced to the extended position at which at least a portion of the plunger is disposed in the docking region defined between the pair of engagement prongs of the male coupling.

4. The coupling assembly of claim 1 further comprising a biasing member to bias the plunger to the extended position.

5. A drain cleaning cable coupling assembly comprising:
a male coupling including a pair of engagement prongs, the engagement prongs spaced apart from one another and defining a docking region therebetween;
a female coupling having a circumferential wall defining a pair of receiving regions sized and shaped to fittingly engage the pair of engagement prongs of the male coupling, the female coupling also defining an outer end face, the circumferential wall defining a generally hollow interior chamber accessible via the end face and the pair of receiving regions;
a plunger movably disposed within the interior chamber of the female coupling, the plunger linearly displaceable between a retracted position and an extended position;
wherein the female coupling includes at least one projection extending into the interior chamber and the plunger includes at least one laterally extending ridge, the plunger and ridge sized and configured such that upon displacement of the plunger to the extended position, the projection contacts the ridge and thereby retains the plunger within the interior chamber.

6. The coupling assembly of claim 5 wherein the plunger is cylindrical and includes an inner ridge proximate an inner end of the plunger and an outer ridge proximate an outer end of the plunger, and the at least one projection is disposed between the inner ridge and the outer ridge of the plunger.

7. The coupling assembly of claim 6 wherein the at least one projection includes a first radially projecting pin disposed in the circumferential wall of the female coupling, and a second radially projecting pin disposed in the circumferential wall of the female coupling, both the first and the second pins disposed between the inner ridge and the outer ridge of the plunger.

8. A torque transmitting cable coupling assembly comprising:
a male coupling including (i) a disc shaped head defining an outer face and an oppositely directed inner face, (ii) a centrally disposed and axially extending cable receiving section extending from the inner face of the head, and (iii) a pair of axially extending engagement prongs extending from the outer face of the head, the pair of engagement prongs spaced apart from each other to thereby define a docking region;
a female coupling including (i) a cylindrical body having an outer circumferential surface and defining an outer face and an oppositely directed inner face, the body further defining an interior chamber accessible from the outer face of the body, and (ii) a centrally disposed and axially extending cable receiving section extending from the inner face of the body, the body further defining a pair of receiving regions in the body, each receiving region extending between the outer circumferential surface and the interior chamber and each receiving region sized and shaped to fittingly engage a corresponding engagement prong of the male coupling;
a plunger movably disposed in the interior chamber defined in the body of the female coupling, the plunger axially positionable within the interior chamber between (i) a retracted position in which the pair of receiving regions defined in the body of the female coupling are unobstructed and (ii) an extended position in which at least a portion of the plunger obstructs the pair of receiving regions defined in the body of the female coupling assembly, the plunger including at least one radially extending ridge that extends around the circumference of the plunger.

9. The cable coupling assembly of claim 8 wherein the interior chamber defined in the body of the female coupling extends from the outer face of the body of the female coupling to an interior end wall defined in the body of the female coupling; the cable coupling further comprising:
a biasing member disposed at least partially within the interior chamber defined in the body of the female coupling, and between the plunger and the interior end wall in the body, wherein the biasing member urges the plunger toward the extended position in which at least a portion of the plunger obstructs the pair of receiving regions defined in the body of the female coupling.

10. A torque transmitting cable coupling assembly comprising:
a male coupling including (i) a disc shaped head defining an outer face and an oppositely directed inner face, (ii) a centrally disposed and axially extending cable receiving section extending from the inner face of the head, and (iii) a pair of axially extending engagement prongs extending from the outer face of the head, the pair of engagement prongs spaced apart from each other to thereby define a docking region;
a female coupling including (i) a cylindrical body having an outer circumferential surface and defining an outer face and an oppositely directed inner face, the body further defining an interior chamber accessible from the outer face of the body, and (ii) a centrally disposed and axially extending cable receiving section extending from the inner face of the body, the body further defining a pair of receiving regions in the body, each receiving region extending between the outer circumferential surface and the interior chamber and each receiving region sized and shaped to fittingly engage a corresponding engagement prong of the male coupling;

a plunger movably disposed in the interior chamber defined in the body of the female coupling, the plunger axially positionable within the interior chamber between (i) a retracted position in which the pair of receiving regions defined in the body of the female coupling are unobstructed and (ii) an extended position in which at least a portion of the plunger obstructs the pair of receiving regions defined in the body of the female coupling assembly;

wherein the plunger includes at least one member extending laterally outward from an outer surface of the plunger, and the body of the female coupling includes a projection that extends into the interior chamber defined in the body of the female coupling, the projection located within the interior chamber such that the projection of the body and the member of the plunger contact each other upon positioning the plunger to the extended position.

11. The cable coupling assembly of claim 10 wherein the at least one member extending laterally outward from an outer surface of the plunger includes a radially extending inner ridge disposed proximate an end of the plunger and a radially extending outer ridge spaced from the inner ridge and disposed proximate another end of the plunger, the projection of the body of the female coupling at least partially disposed between the inner ridge and the outer ridge.

12. The cable coupling assembly of claim 11 wherein upon positioning the plunger to the retracted position, the projection contacts the outer ridge.

13. The cable coupling assembly of claim 11 wherein upon positioning the plunger to the extended position, the projection contacts the inner ridge.

* * * * *